United States Patent
Jang (10) Patent No.: US 9,506,444 B2
(45) Date of Patent: Nov. 29, 2016

(54) METHOD OF CONTROLLING ENGINE OF ISG VEHICLE

(71) Applicant: LSIS CO., LTD., Anyang-si, Gyeonggi-do (KR)

(72) Inventor: Jae Hoon Jang, Seoul (KR)

(73) Assignee: LSIS CO., LTD., Anyang-si (KR)

( * ) Notice: Subject to any disclaimer, the term of this patent is extended or adjusted under 35 U.S.C. 154(b) by 237 days.

(21) Appl. No.: 14/255,618

(22) Filed: Apr. 17, 2014

(65) Prior Publication Data

US 2015/0019114 A1    Jan. 15, 2015

(30) Foreign Application Priority Data

Jul. 9, 2013    (KR) .................. 10-2013-0080581

(51) Int. Cl.
| | |
|---|---|
| F02N 15/02 | (2006.01) |
| F02N 19/00 | (2010.01) |
| F02N 11/02 | (2006.01) |
| F02N 11/08 | (2006.01) |
| G08G 1/0967 | (2006.01) |

(52) U.S. Cl.
CPC ........ *F02N 11/0814* (2013.01); *F02N 11/0837* (2013.01); *G08G 1/096725* (2013.01); *F02N 11/0822* (2013.01); *F02N 11/0825* (2013.01); *F02N 2200/023* (2013.01); *F02N 2200/024* (2013.01); *F02N 2200/125* (2013.01); *F02N 2300/306* (2013.01); *Y02T 10/48* (2013.01)

(58) Field of Classification Search
CPC .............. Y02T 10/48; F02N 11/0855; F02N 2200/022; F02N 11/0814; F02N 11/087
USPC .................. 123/179.3, 179.4; 701/112, 113
See application file for complete search history.

(56) References Cited

U.S. PATENT DOCUMENTS

| | | | |
|---|---|---|---|
| 6,112,152 A | 8/2000 | Tuttle | |
| 2002/0157883 A1 | 10/2002 | Ogata et al. | |
| 2010/0125402 A1 | 5/2010 | Bansal et al. | |

FOREIGN PATENT DOCUMENTS

| | | |
|---|---|---|
| CN | 102529855 | 7/2012 |
| CN | 102529943 | 7/2012 |
| DE | 4038013 | 6/1992 |

(Continued)

OTHER PUBLICATIONS

Japan Patent Office Application Serial No. 2014-096517, Office Action dated Aug. 4, 2015, 5 pages.

(Continued)

*Primary Examiner* — Hai Huynh
*Assistant Examiner* — Raza Najmuddin
(74) *Attorney, Agent, or Firm* — Lee Hong Degerman Kang & Waimey (57) ABSTRACT

Provided is a method of controlling an engine of an idle-stop and go (ISG) vehicle. The method includes allowing, when an engine stop condition is satisfied, the engine to idle-stop and maintaining, when an engine stop signal is transmitted from an outside, an idle-stop state of the engine although an engine restarting condition is satisfied.

9 Claims, 5 Drawing Sheets

(56) References Cited

FOREIGN PATENT DOCUMENTS

| | | | |
|---|---|---|---|
| JP | DE 3231567 A1 * | 3/1983 | .......... F02N 11/0822 |
| JP | 2000-018059 | 1/2000 | |
| JP | 2000-145492 | 5/2000 | |
| JP | 2000145492 A * | 5/2000 | |
| JP | 2001055938 A * | 2/2001 | |
| JP | 2006-170180 | 6/2006 | |
| JP | 2007-056734 | 3/2007 | |
| JP | 2012-003351 | 1/2012 | |
| JP | 2012-172637 | 9/2012 | |

OTHER PUBLICATIONS

European Patent Office Application Serial No. 14166318.7, Search Report dated Oct. 8, 2014, 9 pages.

The State Intellectual Property Office of the People's Republic of China Application Serial No. 201410325774.1 Office Action dated Oct. 29, 2015, 7 pages.

Japan Patent Office Application Serial No. 2014-096517, Office Action dated Nov. 24, 2015, 4 pages.

* cited by examiner

METHOD OF CONTROLLING ENGINE OF ISG VEHICLE

CROSS-REFERENCE TO RELATED APPLICATIONS

Pursuant to 35 U.S.C. §119(a), this application claims the benefit of earlier filing date and right of priority to Korean Patent Application No. 10-2013-0080581, filed on Jul. 9, 2013, the contents of which are hereby incorporated by reference in their entirety.

BACKGROUND

The present disclosure relates to a method of controlling an engine of a vehicle mounted with an idle-stop and go (ISG) device, and more particularly, to a method of controlling an engine of an ISG vehicle by using radio frequency identification.

Generally, an ISG device is used for a vehicle to improve fuel efficiency, which automatically turns off the ignition of an engine when the vehicle stops or idles and automatically turns on the ignition of the engine when the vehicle starts driving.

ISG vehicles receive information such as vehicle speed, engine speed, and cooling water temperature, automatically idle-stop an engine in an appointed condition, and automatically restart (go) the engine to normally drive when it is necessary to restart due to an attempt of a driver or a own condition of the vehicle.

For example, ISG devices may perform an operation of automatically turning on the ignition of the engine when a driver shifts into a first gear of a vehicle installed with manual shifts or steps on an accelerating pedal instead of putting on a brake pedal.

In case of a vehicle installed with an ISG device, while the vehicle is stopping or idling, it is necessary to allow electronic devices of 12 V, forming the vehicle, to be driven.

Merely, a battery voltage of 12 V of vehicles installed with an ISG device may decrease due to frequent ignitions and then electronic devices of 12 V receiving power from the 12 V battery may not operate.

SUMMARY

Embodiments provide a method of controlling an engine of an idle-stop and go (ISG) vehicle, capable of preventing a traffic signal violation of the vehicle by controlling the engine thereof corresponding to an externally received control signal.

Embodiments also provide a method of controlling an engine of an ISG vehicle uniformly maintaining a battery power voltage of 12 V and an engine temperature by determining an engine stop signal received at a radio frequency identification (RFID) tag to be a higher priority than other conditions except a low voltage of the 12 V battery and an overheated engine.

In one embodiment, a method of controlling an engine of an idle-stop and go (ISG) vehicle includes allowing, when an engine stop condition is satisfied, the engine to idle-stop and maintaining, when an engine stop signal is transmitted from an outside, an idle-stop state of the engine although an engine restarting condition is satisfied.

In another embodiment, an ISG vehicle includes an engine idle-stopping and being restarted and a controller controlling the engine to idle-stop when an engine stop condition is satisfied and maintaining an idle-stop state of the engine although an engine restarting condition is satisfied, when an engine stop signal is transmitted from an outside.

According to the embodiments, an engine of an ISG vehicle is controlled corresponding to a control signal transmitted from an outside, thereby preventing a traffic signal violation of the vehicle.

Also, according to the embodiments, a power voltage of a 12 V battery of an ISG vehicle, an engine temperature, etc. may be uniformly maintained by determining an engine stop signal received by an RFID tag to be prior to other conditions except a low voltage of the 12 V battery, overheating of an engine, etc.

The details of one or more embodiments are set forth in the accompanying drawings and the description below. Other features will be apparent from the description and drawings, and from the claims.

DETAILED DESCRIPTION OF THE EMBODIMENTS

Since there may be present various modifications and several embodiments, exemplary embodiments will shown in the drawings and will be described in detail.

However, it is not to limit to the exemplary embodiments but should be understood as including all modifications, equivalents, and substitutes included in the spirit and the technical scope.

It will be understood that although the terms "first", "second", etc. may be used herein to describe various components, these components should not be limited by these terms. These terms are only used to distinguish one component from another. For example, within the scope, a first component may be designated as a second component, and similarly, the second component may be designated as the first component.

It will be understood that when a component is referred to as being "connected to" another component, it can be directly or indirectly connected to the other component. That is, for example, intervening components may be present.

Terms are used herein only to describe the exemplary embodiments but not to limit the present invention. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. It will be understood that terms defined in dictionaries generally used are interpreted as including meanings identical to contextual meanings of the related art, unless definitely defined otherwise in the present application, are not interpreted as being ideal or excessively formal meanings.

Hereinafter, the exemplary embodiments will be described in more detail with reference to the attached drawings. Throughout the description, for easily understanding of the entire, like reference numerals refer to like elements and a repetitive description of the like element will be omitted.

Figure 1:
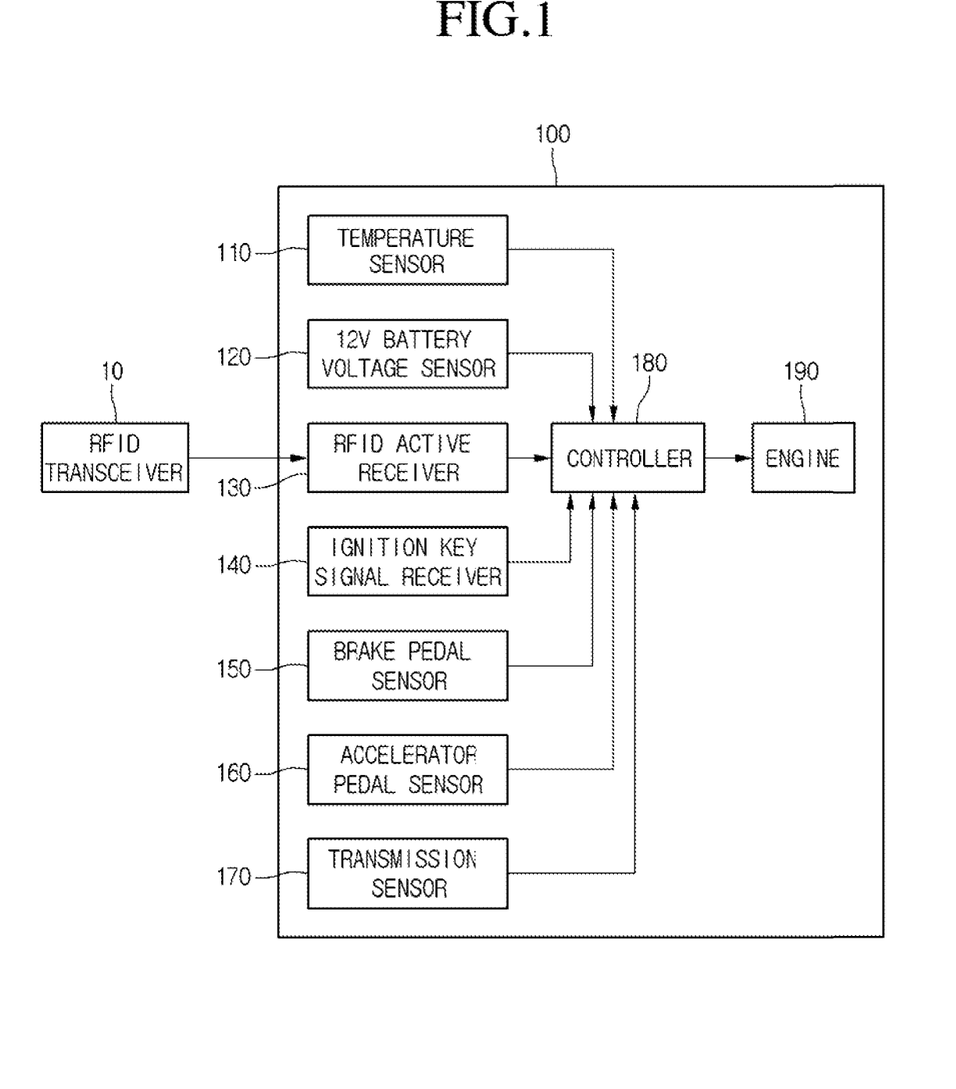
FIG. 1 is a block diagram of an engine control system of an idle-stop and go (ISG) vehicle according to an embodiment.

FIG. 1 is a block diagram of an engine control system of an idle-stop and go (ISG) vehicle according to an embodiment.

Referring to FIG. 1, the engine control system of the ISG vehicle includes a radio frequency identification (RFID) transceiver 10 and an ISG vehicle engine control device 100.

The RFID transceiver 10 continuously transmits an engine stop signal or an engine restarting signal to the ISG vehicle engine control device 100. The RFID transceiver 10 may periodically transmit the engine stop signal or the engine restarting signal to the ISG vehicle engine control device 100. The engine stop signal or the engine restarting signal may be read by an active RFID tag included in the ISG vehicle engine control device 100.

The RFID transceiver 10 is located outside the ISG vehicle, and for example, may be installed on traffic lights installed on crossroads or pedestrian crossings. The RFID transceiver 10 may include an RFID reader and an antenna.

When traffic lights show a pass sign such as a green light, the RFID transceiver 10 may transmit the engine restarting signal to the ISG vehicle engine control device 100 of the ISG vehicle stopping at crossroads or pedestrian crossings. Also, when traffic lights show a stop sign such as a red light, the RFID transceiver 10 may transmit the engine stop signal to the ISG vehicle engine control device 100 of the ISG vehicle present in a predetermined region around crossroads or pedestrian crossings.

The ISG vehicle engine control device 100 includes a temperature sensor 110, a 12 V battery voltage sensor 120, an RFID active receiver 130, an ignition key signal receiver 140, a brake pedal sensor 150, an accelerator pedal sensor 160, a transmission sensor 170, a controller 180, and an engine 190.

The temperature sensor 110 senses a temperature of cooling water for cooling heat generated by the engine 190, a temperature of an engine oil, etc. and outputs an electric signal. The temperature sensor 110 may transmit a cooling water temperature signal and an engine oil temperature signal to the controller 180.

The 12 V battery voltage sensor 120 senses a power voltage of a 12 V battery. The 12 V battery voltage sensor 120, when the power voltage of the 12 V battery is less than a reference voltage, may transmit a signal to the controller 180 to inform that the power voltage of the 12 V battery is sensed as being less than the reference voltage.

The RFID active receiver 130 includes an RFID active tag. RFID tags are divided into RFID active tags and RFID passive tags. RFID active tags have an independent power source, thereby increasing a recognition distance with an RFID reader and reducing a loss in power of the RFID reader. The RFID active receiver 130 may include an RFID passive tag. The RFID passive tag is at a relatively lower price and has no limitation in a period of use, thereby being semipermanently used. The RFID active receiver 130 transmits and receives electric waves with an antenna of the RFID reader by using an antenna built in the RFID active tag, thereby performing data communication. Also, the RFID active receiver 130 may transmit the signal transmitted from the RFID transceiver 10 to the controller 180.

The ignition key signal receiver 140 receives an ignition key on signal or an ignition key off signal. The ignition key signal receiver 140 may transmit an ignition key signal according to a user input to the controller 180.

The brake pedal sensor 150 senses a brake pedal input of the driver. The brake pedal sensor 150 may transmit a sensed brake operation signal to the controller 180.

The accelerator pedal sensor 160 senses an accelerator pedal input of the driver. The accelerator pedal sensor 160 may transmit a sensed accelerator operation signal to the controller 180.

The transmission sensor 170 senses a location of a transmission and a time, in which the transmission stays in a corresponding location. The transmission sensor 170 may transmit signals with respect to the sensed location and maintenance time of the transmission to the controller 180.

The controller 180 controls whether to operate of the engine 190 according to signals transmitted from a plurality of sensors and receivers, respectively. The controller 180 may calculate a target engine revolution number based on the cooling water temperature signal or the engine oil temperature signal transmitted from the temperature sensor 110 and may control whether the engine 190 rotates and a number of revolutions. Also, the controller 180, when the signal informing that the power voltage of the 12 V battery is sensed to be less than the reference voltage is transmitted from the 12 V battery voltage sensor 120, may rotate the engine 190 to increase the power voltage of the 12 V battery to be more than the reference voltage.

Also, the controller 180 may control whether to operate the engine 190 according to the signal transmitted from the RFID active receiver 130. For example, the controller 180 may rotate the engine 190 according to the engine restarting signal transmitted from the RFID active receiver 130. Otherwise, the controller 180 may stop the engine 190 according to the engine stop signal transmitted from the RFID active receiver 130.

The controller 180 may turn on the ignition of the engine 190 according to the ignition key on signal transmitted from the ignition key signal receiver 140 or may turn off the ignition of the engine 190 according to the ignition key off signal. The controller 180 may reduce revolutions of the engine 190 when the brake operation signal is transmitted from the brake pedal sensor 150 and may accelerate revolutions of the engine 190 when the accelerator operation signal is transmitted from the accelerator pedal sensor 160.

Also, the controller 180 may control whether to rotate the engine 190 based on a the signal with respect to the location and maintenance time of the transmission transmitted from the transmission sensor 170.

The engine 190 may rotate, stop, or changes in a revolution speed under the control of the controller 180.

Figure 2:
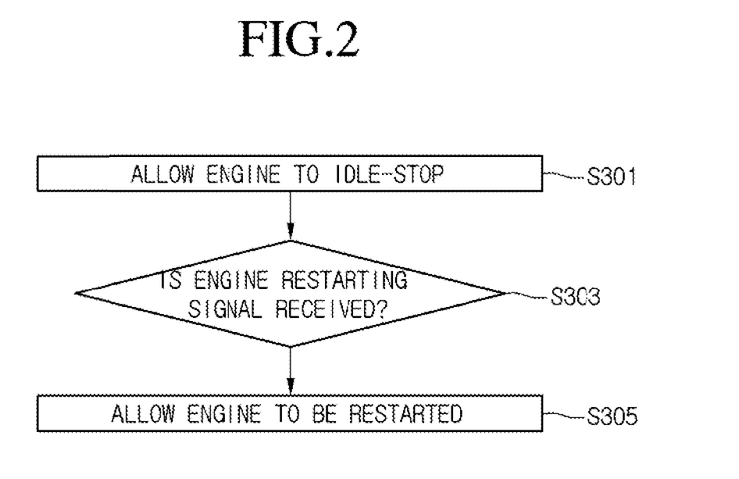
FIG. 2 is a flowchart illustrating a method of restarting an engine of the ISG vehicle of FIG. 1.

FIG. 2 is a flowchart illustrating a method of restarting the engine 190 of the ISG vehicle.

Referring to FIG. 2, the engine 190 idle-stops under the control of the controller 180 corresponding to an external input signal or a user input signal (S301). For example, when traffic lights show a stop sign, the ISG vehicle engine control device 100 of the ISG vehicle driving in the vicinity thereof may receive an engine stop signal from the RFID transceiver 10 included in the traffic lights. When the RFID active receiver 130 transmits the engine stop signal to the controller 180, the engine 190 idle-stops under the control of the controller 180. Also, when the ISG vehicle engine control device 100 receives an ignition key off signal according to a user input from the ignition key signal receiver 140, the engine 190 may stop but is not limited thereto.

Sequentially, the controller 180 determines whether an engine restarting signal is received from an outside (S303). For example, when the traffic lights turn from a red light into a green light, that is, show a pass sign instead of a stop sign, the RFID transceiver 10 may transmit the engine restarting signal to the RFID active receiver 130. When the RFID active receiver 130 transmits the engine restarting signal to the controller 180, the controller 180 may determine that the engine restarting signal is received.

When the engine restarting signal is received, the controller 180 automatically restarts the engine 190 idle-stopping (S305). As described above, the engine 190 may idle-stop or may be restarted according to an engine stop signal or the engine restarting signal transmitted from an outside.

Figure 3:
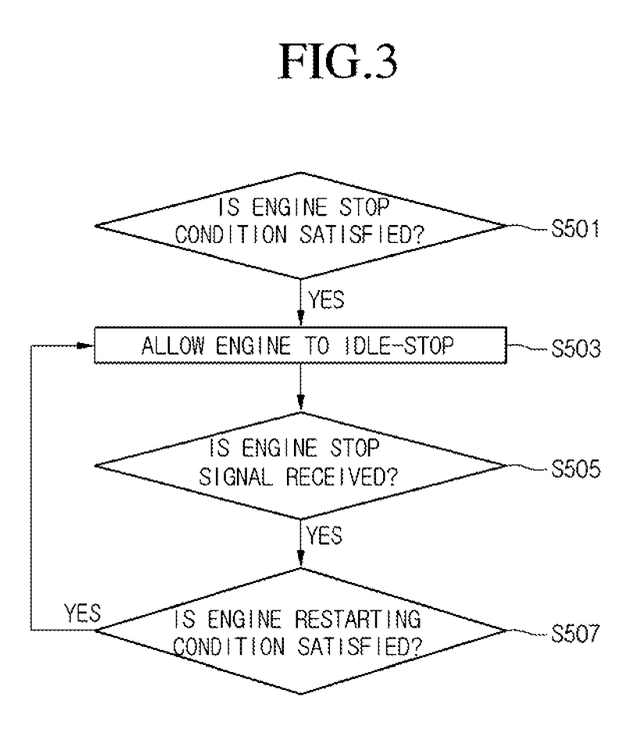
FIG. 3 is a flowchart illustrating a method of idle-stopping the engine of the ISG vehicle of FIG. 1.

FIG. 3 is a flowchart illustrating a method of idle-stopping the engine of the ISG vehicle.

Referring to FIG. 3, the controller 180 determines whether an engine stop condition is satisfied (S501) and the engine 190 idle-stops under the control of the controller 180 when the engine stop condition is satisfied (S503).

The engine stop condition may mean a condition for allowing the engine 190 to idle-stop. The engine stop condition, for example, may be a case, in which the ignition key signal receiver 140 receives an ignition key off signal according to a user input or the brake pedal sensor 150 senses a brake pedal input of a driver, but is not limited thereto.

Sequentially, the controller 180 determines whether the ISG vehicle receives an engine stop signal from the outside (S505). When traffic lights show a stop sign, the ISG vehicle engine control device 100 of may receive an engine stop signal from the RFID transceiver 10 included in the traffic lights.

Sequentially, although the engine restarting condition is satisfied (S507), the controller 180 may receive an idle-stop state of the engine 190 (S503). When the ISG vehicle receives the engine stop signal from the outside and the engine restarting signal is not yet received, that is, the traffic lights maintain the stop sign, the controller 180 does not restart the engine 190 although the engine restarting condition is satisfied.

In this case, the engine restarting condition, for example, may be a case, in which the ignition key signal receiver 140 receives an ignition key on signal according to a user input, the accelerator pedal sensor 160 senses an accelerator pedal input of the driver, or the transmission sensor 170 senses shifting a gear to a first gear, but is not limited thereto.

In other words, a condition, in which the RFID active receiver 130 receives the engine restarting signal, may be prior to a plurality of other engine restarting conditions. As a result thereof, when the traffic lights show the stop sign, although the engine restarting condition is satisfied according to the user input, the engine 190 does not restart, thereby preventing a traffic signal violation of a vehicle.

Merely, although the traffic lights show the stop sign and the vehicle is stopping, electronic devices of 12 V inside the vehicle need to be driven. Accordingly, when a power voltage of the 12 V battery allowing the electronic devices of 12 V to drive is less than due to a stop of the vehicle, it is necessary that the controller 180 restarts the engine 190.

Hereinafter, referring to FIGS. 4 and 5, an engine restarting condition prior to the condition, in which the RFID active receiver 130 receives the engine restarting signal, will be described.

Figure 4:
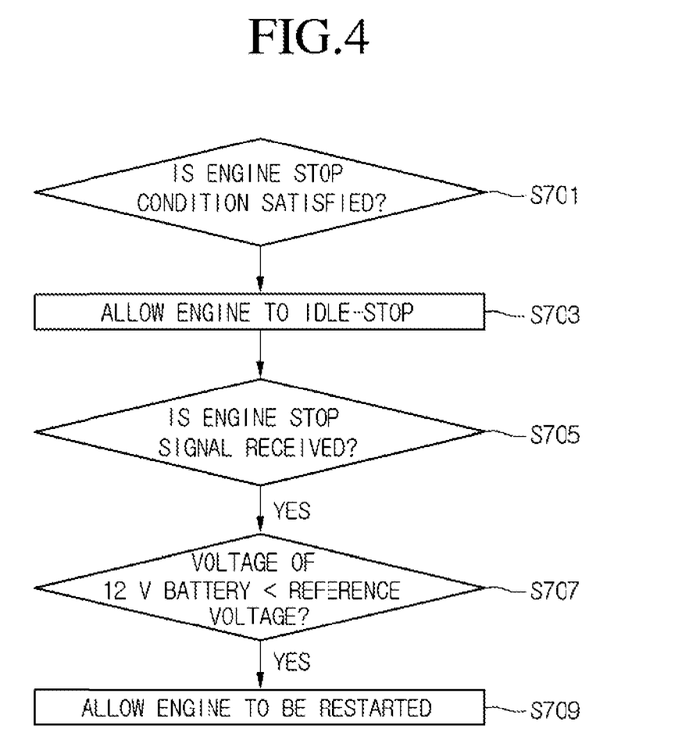
FIG. 4 is a flowchart illustrating a method of controlling the engine of the ISG vehicle, applied with a priority according to an embodiment.

FIG. 4 is a flowchart illustrating a method of controlling the engine 190 of the ISG vehicle, applied with a priority according to an embodiment.

Referring to FIG. 4, the controller 180 determines whether an engine stop condition is satisfied (S701) and the engine 190 idle-stops under the control of the controller 180 when the engine stop condition is satisfied (S703).

Sequentially, the controller 180 determines whether an engine stop signal is received from the RFID transceiver 10 included in traffic lights (S705).

Also, the controller 180 determines whether a signal informing that a power voltage of the 12 V battery is sensed to be less than a reference voltage is transmitted from the 12 V battery voltage sensor 120 (S707).

In case that an engine restarting condition of maintaining the power voltage of the 12 V battery is prior to a condition, in which the RFID active receiver 130 receives the engine restarting signal, although the engine stop signal is received from the RFID transceiver 10, the controller 180 controls the engine 190 to be restarted when the signal informing that the power voltage of the 12 V battery is sensed to be less than the reference voltage is transmitted from the 12 V battery voltage sensor 120 (S709). As a result thereof, although the traffic lights show the stop sign and the vehicle is stopping, when the power voltage of the 12 V battery for allowing the electronic devices to be driven is less than the reference voltage due to the stop of the vehicle, the controller 180 may restart the engine 190 to drive the electronic devices of 12 V inside the vehicle.

Figure 5:
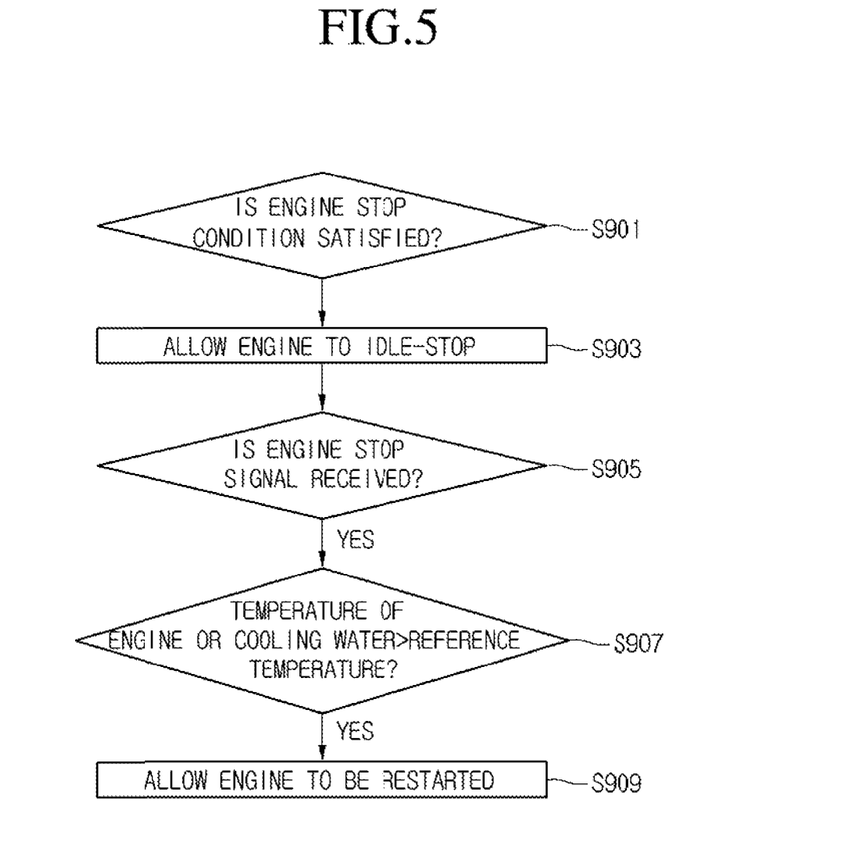
FIG. 5 is a flowchart illustrating a method of controlling the engine of the ISG vehicle, applied with a priority according to another embodiment.

FIG. 5 is a flowchart illustrating a method of controlling the engine 190 of the ISG vehicle, applied with a priority according to another embodiment.

Referring to FIG. 5, the controller 180 determines whether an engine stop condition is satisfied (S901) and the engine 190 idle-stops under the control of the controller 180 when the engine stop condition is satisfied (S903).

Sequentially, the controller 180 determines whether an engine stop signal is received from the RFID transceiver 10 included in traffic lights (S905).

Also, the controller 180 determines whether a cooling water temperature or an engine temperature is more than a reference voltage, based on a cooling water temperature signal and an engine oil temperature signal transmitted from the temperature sensor 110 (S907).

In case that an engine restarting condition of maintaining the temperature of the engine or the cooling water is prior to a condition, in which the RFID active receiver 130 receives the engine restarting signal, although the engine stop signal is received from the RFID transceiver 10, the controller 180 controls the engine 190 to be restarted when a signal informing that a cooling water temperature or engine temperature is sensed to be higher than the reference temperature is transmitted from the temperature sensor 110 (S909). As a result thereof, although the traffic lights show a stop sign and the vehicle is stopping, when the engine 190 is overheated, the controller 180 may prevent the overheating of the engine 190 by restarting the engine 190.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling an engine of an idle-stop and go (ISG) vehicle, the method comprising:
   allowing, when an engine stop condition is satisfied, the engine to idle-stop;
   maintaining, when an engine stop signal is transmitted from an outside, an idle-stop state of the engine although an engine restarting condition is satisfied, and
   restarting the engine when an engine restarting signal is transmitted from the outside,
   restarting the engine, prior to the engine restarting signal being transmitted from the outside, when a power voltage of a 12V battery is less than a reference voltage, or when either a cooling water temperature or an engine oil temperature is higher than a reference temperature.

2. The method of claim 1, wherein the engine restarting condition comprises at least one of receiving an ignition key on signal according to a user input, sensing an accelerator pedal input, or shifting a gear to move the vehicle.

3. The method of claim 1, wherein the engine stop condition comprises at least one of receiving an ignition key off signal according to a user input, sensing a brake pedal input, shifting a gear to stop the vehicle, or receiving the engine stop signal transmitted from the outside.

4. The method of claim 1, wherein the engine stop signal is transmitted from a radio frequency identification (RFID) transceiver located in the outside and is received by an RFID tag included in the ISG vehicle.

5. An ISG vehicle comprising:
   an engine idle-stopping and being restarted; and
   a controller configured to:
   control the engine to idle-stop when an engine stop condition is satisfied and maintaining an idle-stop state of the engine although an engine restarting condition is satisfied, when an engine stop signal is transmitted from an outside, and
   restart the engine, prior to the engine restarting signal being transmitted from the outside, when a power voltage of a 12V battery is less than a reference voltage, or when either a cooling water temperature or an engine oil temperature is higher than a reference temperature.

6. The ISG vehicle of claim 5, wherein the engine restarting condition comprises at least one of receiving an ignition key on signal according to a user input, sensing an accelerator pedal input, or shifting a gear to move the vehicle.

7. The ISG vehicle of claim 5, wherein the engine stop condition comprises at least one of receiving an ignition key off signal according to a user input, sensing a brake pedal input, shifting a gear to stop the vehicle, or receiving the engine stop signal transmitted from the outside.

8. The ISG vehicle of claim 5, wherein the controller controls the engine to be restarted when receiving the engine restarting signal from the outside.

9. The ISG vehicle of claim 5, wherein the engine stop signal is transmitted from an RFID transceiver located in the outside, the ISG vehicle further comprising an RFID tag receiving the engine stop signal.

* * * * *